(12) United States Patent
Shiota

(10) Patent No.: US 11,375,110 B2
(45) Date of Patent: Jun. 28, 2022

(54) IMAGE PROCESSING APPARATUS, IMAGE PICKUP APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Ryo Shiota, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/116,848

(22) Filed: Dec. 9, 2020

(65) Prior Publication Data
US 2021/0195100 A1 Jun. 24, 2021

(30) Foreign Application Priority Data
Dec. 18, 2019 (JP) .............................. JP2019-228214

(51) Int. Cl.
*H04N 5/232* (2006.01)
*G06T 5/50* (2006.01)

(52) U.S. Cl.
CPC .......... *H04N 5/23232* (2013.01); *G06T 5/50* (2013.01); *G06T 2207/20221* (2013.01); *H04N 5/23212* (2013.01); *H04N 5/23293* (2013.01)

(58) Field of Classification Search
None
See application file for complete search history.

(56) References Cited

U.S. PATENT DOCUMENTS

| | | | | |
|---|---|---|---|---|
| 7,161,616 B1* | 1/2007 | Okamoto | ............... | G06T 3/4038 348/148 |
| 8,736,706 B1* | 5/2014 | Valente | ............ | H04N 5/232133 348/222.1 |
| 2008/0170749 A1* | 7/2008 | Albertson | .......... | G06K 9/00979 382/103 |
| 2017/0316575 A1* | 11/2017 | Adachi | ................... | G06T 7/254 |

FOREIGN PATENT DOCUMENTS

JP 2015216532 A 12/2015

\* cited by examiner

*Primary Examiner* — James M Hannett
(74) *Attorney, Agent, or Firm* — Canon U.S.A., Inc. IP Division

(57) ABSTRACT

An apparatus includes a memory configured to store instructions and a processor in communication with the memory and configured to execute the instructions to generate a composite map from a plurality of images having different in in-focus position in an optical axis direction, correct the composite map, and combine the plurality of images using the composite map corrected by the correction unit to generate a composite image, wherein a depth of field of the composite image is deeper than a depth of field of each of the plurality of images, and further detect a first region surrounded by values each representing a composition ratio in the composite map and each different from an outer periphery by a first threshold or more, determine a correction value from a second region in the outer periphery of the first region, and correct the first region using the correction value.

22 Claims, 11 Drawing Sheets

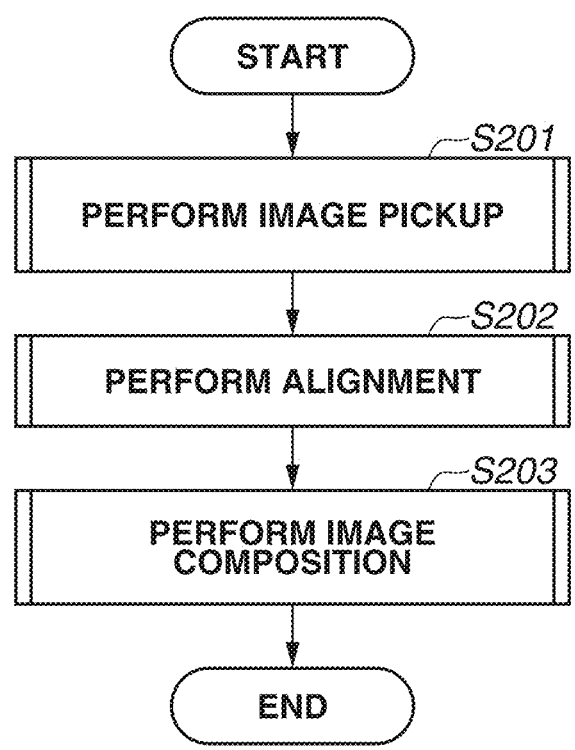

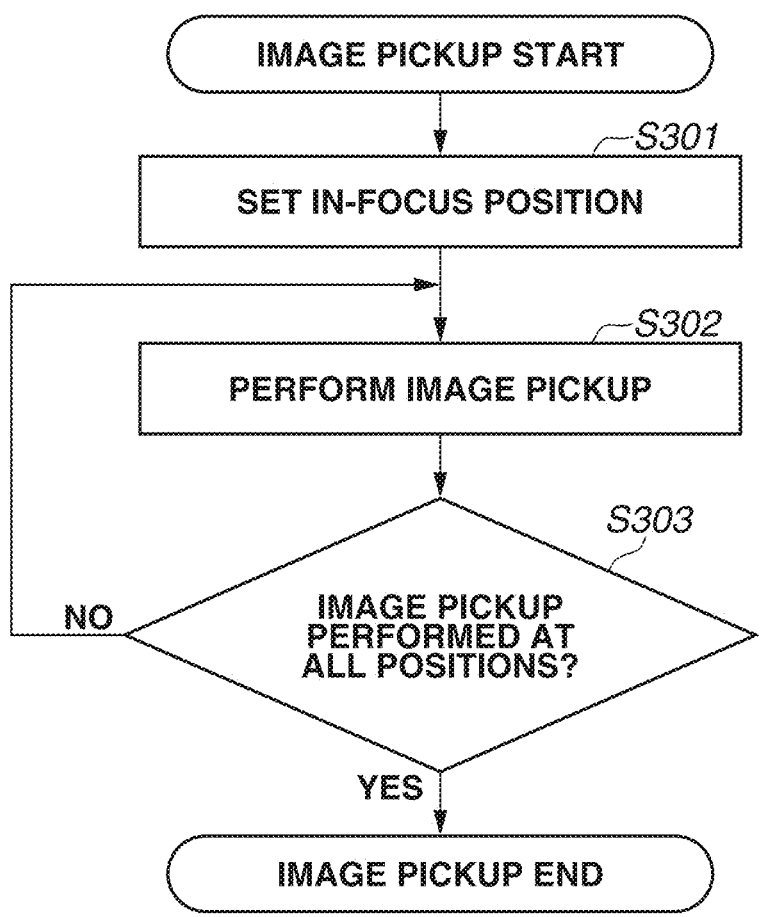

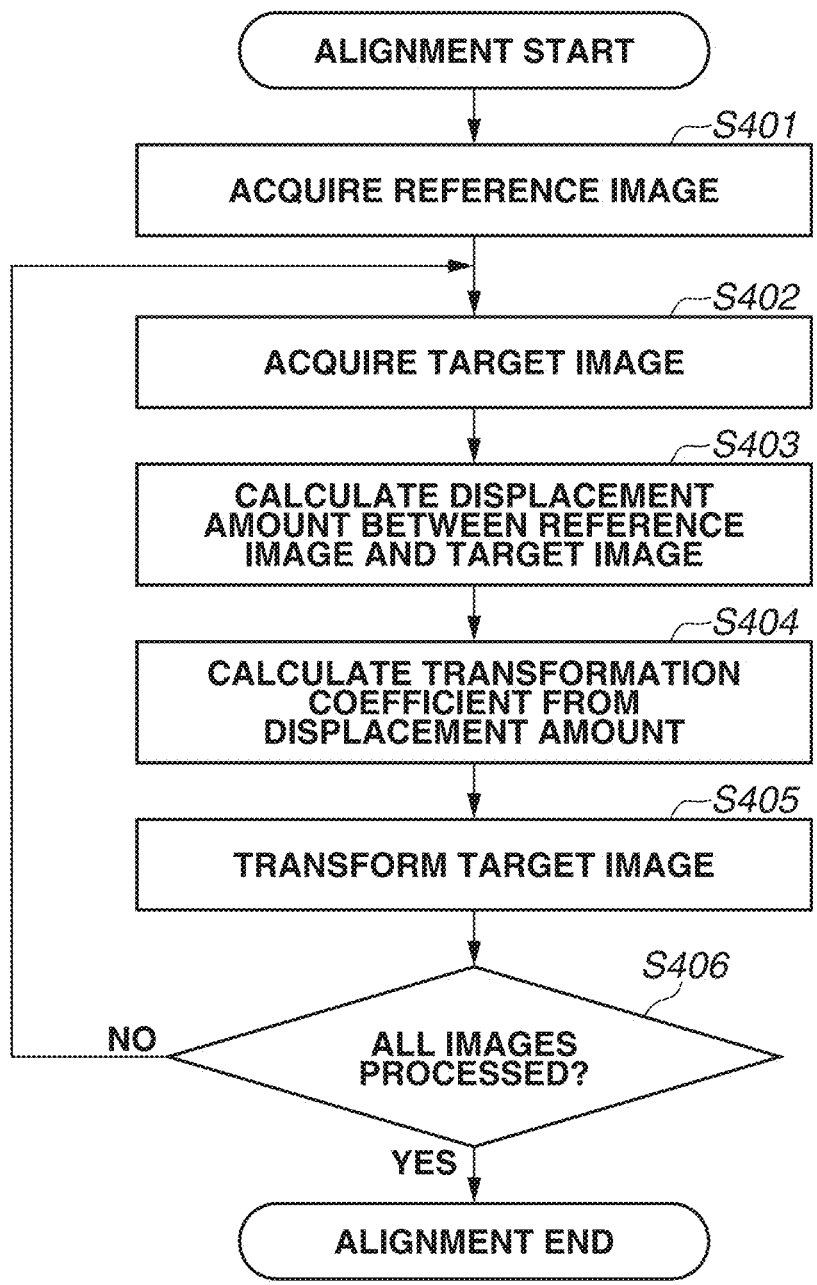

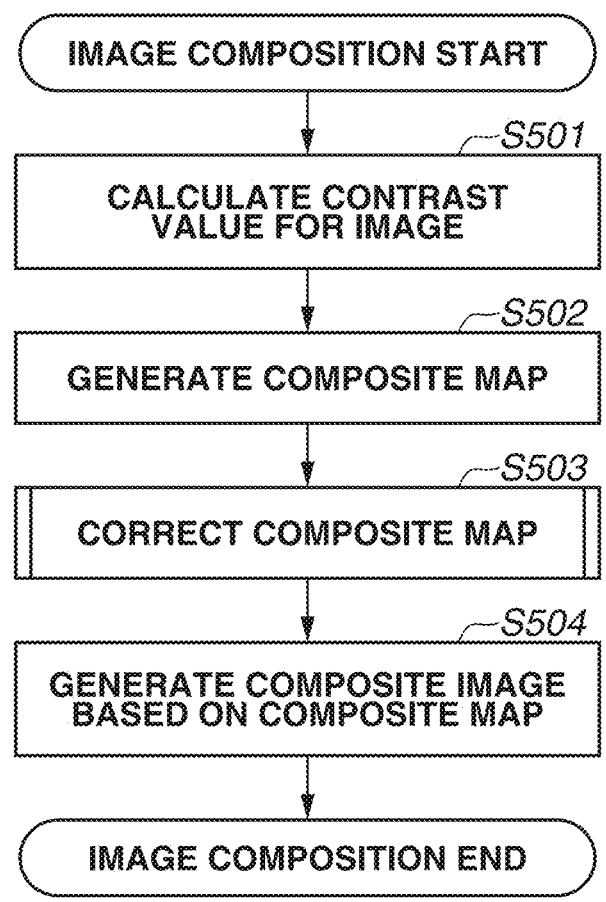

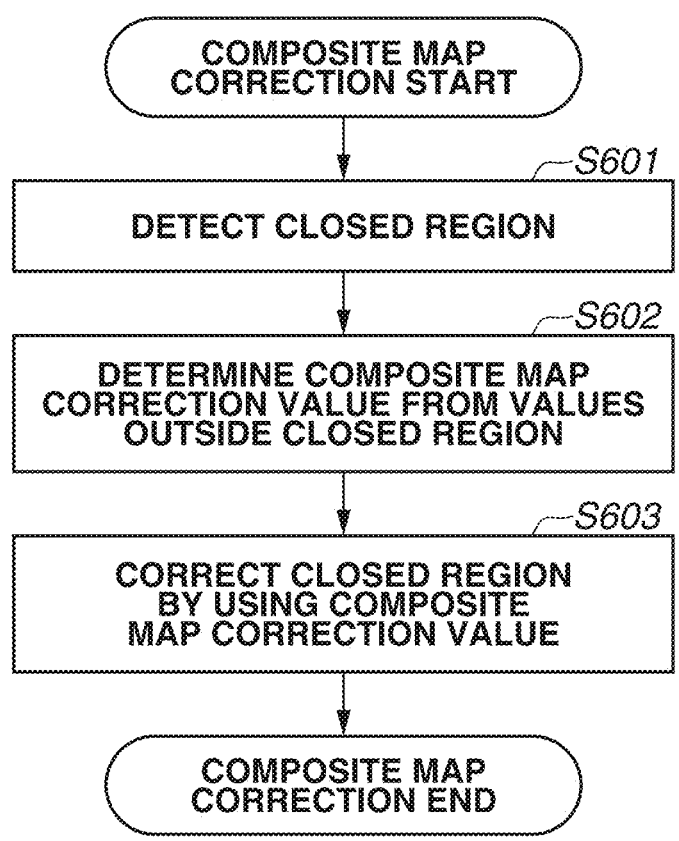

FOCUSED AT IN-FOCUS POSITION 704

FOCUSED AT IN-FOCUS POSITION 705

COMPOSITE IMAGE

COMPOSITE MAP

COMPOSITE MAP
(EXTRACTED)

OUTER PERIPHERAL
REGION OF
COMPOSITE MAP

COMPOSITE MAP
(AFTER CORRECTION)

IMAGE PROCESSING APPARATUS, IMAGE PICKUP APPARATUS, IMAGE PROCESSING METHOD, AND NON-TRANSITORY COMPUTER-READABLE STORAGE MEDIUM

BACKGROUND OF THE DISCLOSURE

Field of the Disclosure

The aspect of the embodiments relates to an image processing apparatus that combines a plurality of images having difference in in-focus position.

Description of the Related Art

In a case where an image target object by a digital camera, for example, is a plurality of objects having great difference in distance from each other in an optical axis direction, or in a case where an imaging target object is an object long in a depth direction, a part of the object can be in focus because of an insufficient depth of field. Japanese Patent Application Laid-Open No. 2015-216532 discusses a focus stacking technique to address the above described issue. In the focus stacking, a plurality of images having difference in in-focus position is captured, an in-focus area is extracted from each of the images, and the extracted in-focus areas are combined into one image, and therefore a composite image in which the entire imaging area is in focus is generated. In Japanese Patent Application Laid-Open No. 2015-216532, an area having the highest contrast value among areas at the same positions in the plurality of images is determined as the in-focus area.

In a case where the focus stacking method discussed in Japanese Patent Application Laid-Open No. 2015-216532 is used for an object having luster or reflected light, blurs of the luster or reflected light can be combined.

SUMMARY OF THE DISCLOSURE

According to an aspect of the embodiments, an apparatus includes a composite-map generation unit that generates a composite map from a plurality of images having different in in-focus position in an optical axis direction, a correction unit that corrects the composite map, and a combining unit that combines the plurality of images using the composite map corrected by the correction unit to generate a composite image, wherein a depth of field of the composite image is deeper than the depth of field of each of the plurality of images, and wherein the correction unit detects a first region surrounded by values each representing a composition ratio in the composite map and each different from an outer periphery by a first threshold or more, determines a correction value from a second region in the outer periphery of the first region, and corrects the first region using the correction value.

Further features of the disclosure will become apparent from the following description of exemplary embodiments with reference to the attached drawings.

BRIEF DESCRIPTION OF THE DRAWINGS

FIG. 2 is a flowchart illustrating generation of a composite image according to the exemplary embodiment of the disclosure.

FIG. 3 is a flowchart illustrating image pickup in the exemplary embodiment of the disclosure.

FIG. 4 is a flowchart illustrating alignment in the exemplary embodiment of the disclosure.

FIG. 5 is a flowchart illustrating image composition in the exemplary embodiment of the disclosure.

FIG. 6 is a flowchart illustrating composite map correction in the exemplary embodiment of the disclosure.

DESCRIPTION OF THE EMBODIMENTS

An exemplary embodiment of the disclosure will be described in detail below with reference to the attached drawings.

Figure 1:
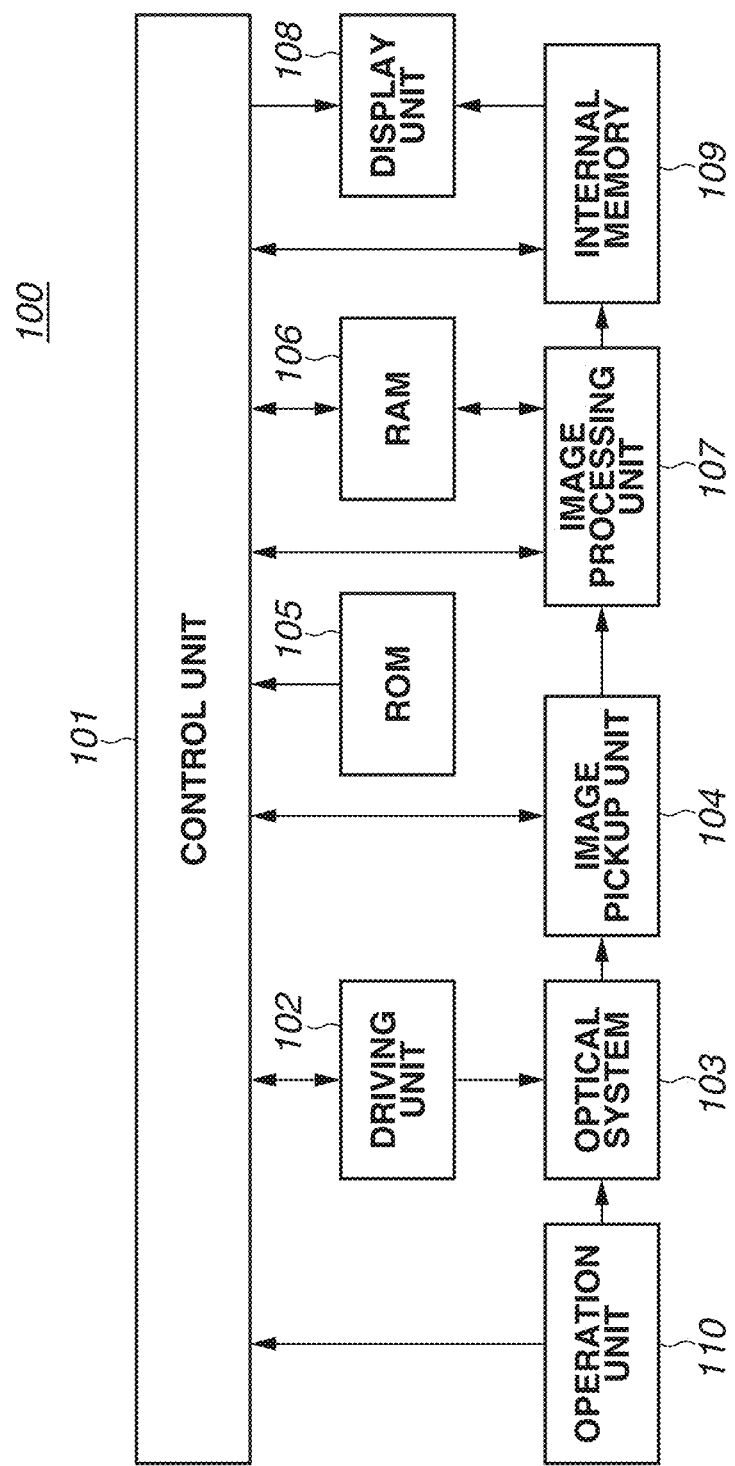
FIG. 1 is a block diagram illustrating a structure of a digital camera according to an exemplary embodiment of the disclosure.

FIG. 1 is an example of a block diagram illustrating a configuration of a digital camera serving as an image processing apparatus according to the present exemplary embodiment. A digital camera 100 can pick up a still image, and is also capable of recording information of a focus position, calculating a contrast value, and combining images. Further, the digital camera 100 can perform enlargement processing or reduction processing on an image stored after image pickup or an image input from outside.

A control unit 101 is a signal processor, such as a central processing unit (CPU) or a micro processing unit (MPU), and controls each unit of the digital camera 100 while reading out a program stored beforehand in a read only memory (ROM) 105 to be described below. For example, as will be described below, the control unit 101 issues commands for start and termination of image pickup to an image pickup unit 104 to be described below. Further, the control unit 101 issues a command for image processing to an image processing unit 107 to be described below, based on the program stored in the ROM 105. A command provided by a user is input into the digital camera 100 via an operation unit 110 to be described below, and reaches each unit of the digital camera 100 via the control unit 101.

A driving unit 102 includes a motor, and mechanically operates an optical system 103 to be described below, based on a command of the control unit 10. For example, the driving unit 102 moves the position of a focus lens included in the optical system 103 based on a command of the control unit 101 to adjust the focal length of the optical system 103.

The optical system 103 includes a zoom lens, the focus lens, and a diaphragm. The diaphragm is a mechanism that adjusts the amount of light passing through the optical system 103. A focus position can be changed by changing the position of the lens.

The image pickup unit 104 is a photoelectric conversion element, and photoelectrically converts an incident light signal into an electrical signal. For example, a charge coupled device (CCD) sensor or a complementary metal-oxide semiconductor (CMOS) sensor can be applied to the image pickup unit 104. The image pickup unit 104 can pick up a plurality of temporally consecutive images as frames of a moving image, in a moving-image pickup mode.

The ROM 105 is a read-only nonvolatile memory serving as a storage medium, and stores parameters that is used for an operation of each block included in the digital camera 100, in addition to operation programs for the blocks. A random access memory (RAM) 106 is a rewritable volatile memory, and is used as a temporary storage area for data output during the operation of each of the blocks included in the digital camera 100.

The image processing unit 107 performs various types of image processing including white balance adjustment, color interpolation, and filtering, on an image output from the image pickup unit 104 or data for an image signal recorded in an internal memory 109 to be described below. Further, the image processing unit 107 performs compression processing based on a standard, such as Join Photographic Experts Group (JPEG), on data for an image signal of an image captured by the image pickup unit 104.

The image processing unit 107 is configured of an integrated circuit in which circuits for performing specific processing are integrated (e.g., an application-specific integrated circuit (ASIC)). Alternatively, the control unit 101 may also serves as some or all of the functions of the image processing unit 107, by performing processing based on a program read out by the control unit 101 from the ROM 105. In a case where the control unit 101 serves as all of the functions of the image processing unit 107, the image processing unit 107 may not be provided as a piece of hardware.

A display unit 108 is a display such as a liquid crystal display or an organic electroluminescence (EL) display for displaying an image temporarily stored in the RAM 106, an image stored in the internal memory 109 to be described below, or a setting screen of the digital camera 100.

The internal memory 109 stores an image picked up by the image pickup unit 104, an image processed by the image processing unit 107, and information representing a focus position in image pickup. In place of the internal memory, other device such as a memory card may be used.

The operation unit 110 is, for example, a unit including a button, a switch, a key, and a mode dial attached to the digital camera 100, or a touch panel serving also as the display unit 108. A command provided by the user reaches the control unit 101 via the operation unit 110.

FIG. 2 is a flowchart illustrating generation of a composite image in the present exemplary embodiment. In step S201, the image pickup unit 104 picks up a plurality of images having difference in in-focus position. In step S202, the control unit 101 aligns the plurality of images picked up by the image pickup unit 104 in step S201. In step S203, the image processing unit 107 combines the aligned images to generate a composite image having a deeper depth of field. Each of these steps will be described in detail below.

FIG. 3 is a flowchart illustrating the processing in step S201 in the present exemplary embodiment.

In step S301, the control unit 101 performs an in-focus position setting. For example, the user designates a focus position via the touch panel also serving as the display unit 108, and designates a plurality of in-focus positions evenly spaced from an in-focus position in correspondence with the designated focus position in an optical axis direction. In this processing, the control unit 101 determines an image pickup order for the set in-focus positions, in order of distance.

In step S302, among the in-focus positions set in step S301, the image pickup unit 104 performs image pickup at an in-focus position which comes first in the image pickup order, among in-focus positions at which image pickup has not been performed.

In step S303, the control unit 101 determines whether the image pickup is performed at all the in-focus positions set in step S301. In a case where the image pickup is performed at all the in-focus positions (YES in step S303), the processing in the flowchart ends. In a case where there is an in-focus position at which the image pickup is not performed (NO in step S303), the processing returns to step S302.

In a case where a multiple lens camera including a plurality of the image pickup units 104 is used, the image pickup may be simultaneously performed at the plurality of in-focus positions set in step S301.

FIG. 4 is a flowchart illustrating the processing in step S202 in the present exemplary embodiment.

In step S401, the control unit 101 acquires a reference image for alignment from the images picked up by the image pickup unit 104 in step S201. The reference image for alignment is, for example, the first image in the image pickup order. Alternatively, since the angles of view have slight difference among the captured images because the image pickup is performed while the in-focus position is changed, the reference image for alignment may be an image with the narrowest angle of view among the captured images.

In step S402, the control unit 101 acquires a target image for alignment processing. The target image is an image other than the reference image acquired in step S401 and has not been subjected to the alignment processing. In a case where the reference image is the first image in the image pickup order, the control unit 101 acquires the target images sequentially in the order in which the images are captured.

In step S403, the control unit 101 calculates a displacement amount in terms of position between the reference image and the target image. An example of the method of calculating the displacement amount will be described below. First, the control unit 101 sets a plurality of blocks in the reference image. In one embodiment, the control unit 101 set blocks of the same size. Next, the control unit 101 sets a range wider than each of the blocks of the reference image as a search range, at the same position in the target image as the position of each of the blocks in the reference image. Finally, the control unit 101 calculates a corresponding point at which the sum of absolute difference (hereinafter, SAD) of luminance from the block of the reference image is minimum, in each of the search ranges of the target image. The control unit 101 calculates the displacement amount in terms of position in step S403 as a vector, from the center of the block of the reference image and the above-described corresponding point. The control unit 101 may use a sum of squared difference (hereinafter, SSD) or a normalized cross correlation (hereinafter, NCC) other than the SAD, in calculating the above-described corresponding point.

In step S404, the control unit 101 calculates a transformation coefficient, from the displacement amount in terms of position between the reference image and the target image. The control unit 101 uses, for example, a projective transformation coefficient as the transformation coefficient. However, the transformation coefficient is not limited to the projective transformation coefficient, and an affine transformation coefficient or a simplified transformation coefficient for a horizontal/vertical shift may be used.

In step S405, the image processing unit 107 transforms the target image using the transformation coefficient calculated in step S404.

For example, the image processing unit 107 performs this transformation using the following expression (1):

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix}. \quad (1)$$

In the expression (1), (x',y') represents coordinates after the transformation, and (x,y) represents coordinates before the transformation. A matrix A represents the transformation coefficient calculated by the control unit 101 in step S404.

In step S406, the control unit 101 determines whether all the images except for the reference images are aligned. In a case where all the images except for the reference images are aligned (YES in step S406), the processing in this flowchart ends. In a case where there is an image that has not been processed yet (NO in step S406), the processing returns to step S402.

Further, in a case where a plurality of images captured by the above-described multiple lens camera is aligned, the alignment can be performed by similar processing because a parallax amount generated due to a difference in the position of the optical system 103 can be calculated based on the displacement amount calculation in step S403.

FIG. 5 is a flowchart illustrating the image composition in step S203 in the present exemplary embodiment.

In step S501, the image processing unit 107 calculates a contrast value for each of the images (including the reference image) after the alignment. As an example of the method of calculating the contrast value, the following method is used. First, the image processing unit 107 calculates luminance Y by the following expression (2), from color signals Sr, Sg, and Sb of each pixel.

$$Y = 0.299Sr + 0.587Sg + 0.114Sb \quad (2)$$

Subsequently, the image processing unit 107 calculates a contrast value I using a Sobel filter, in a 3-by-3-pixel matrix L of the luminance Y, as represented by the following expressions (3) to (5):

$$I_h = \begin{pmatrix} -1 & 0 & 1 \\ -2 & 0 & 2 \\ -1 & 0 & 1 \end{pmatrix} \cdot L, \quad (3)$$

$$I_v = \begin{pmatrix} -1 & -2 & -1 \\ 0 & 0 & 0 \\ 1 & 2 & 1 \end{pmatrix} \cdot L, \text{ and} \quad (4)$$

$$I = \sqrt{I_h^2 + I_v^2}. \quad (5)$$

The above-described method of calculating the contrast value I is an example, and as the filter to be used, for example, an edge-detection filter such as a Laplacian filter or a band pass filter that passes frequencies within a predetermined band can also be used.

In step S502, the image processing unit 107 generates a composite map. As a method of generating the composite map, the following method is used. The image processing unit 107 compares the contrast values of the pixels at the same positions in the respective images, and calculates a composition ratio based on the magnitude of the contrast value. Specifically, among the pixels at the same positions, a pixel having the largest contrast value is assigned a composition ratio of 100%, and other pixels at the same positions are each assigned a composition ratio of 0%. In other words, the following expression (6) is satisfied:

$$A_m(x, y) = \max_{k=1} C_k(x, y), \quad (6)$$

where, Cm(x,y) represents the contrast value calculated in step S501, and Am(x,y) represents the ratio of the composite map. Further, m represents an mth image among the plurality of images having difference in in-focus position, x represents the horizontal coordinate of the image, and y represents the vertical coordinate of the image.

However, it may be desirable to adjust the composition ratio appropriately in step S502 to avoid unnatural boundary. Therefore, instead of being binarized to 0% or 100%, the composition ratio of the composite map continuously varies.

In step S503, the image processing unit 107 corrects the composite map calculated in step S502. A specific method therefor will be described below.

In step S504, the image processing unit 107 generates a composite image based on the composite map corrected in step S503.

The composite map correction in step S503 is performed to prevent the spread of a blur of luster or reflected light from being included in the composition, and will be described in detail below with reference to FIG. 6, FIGS. 7A, 7B, 7C, and 7D, and FIGS. 8A, 8B, 8C, and 8D.

FIG. 6 is a flowchart illustrating the composite map correction (composition ratio correction) in step S503 in the present exemplary embodiment.

Figure 7A:
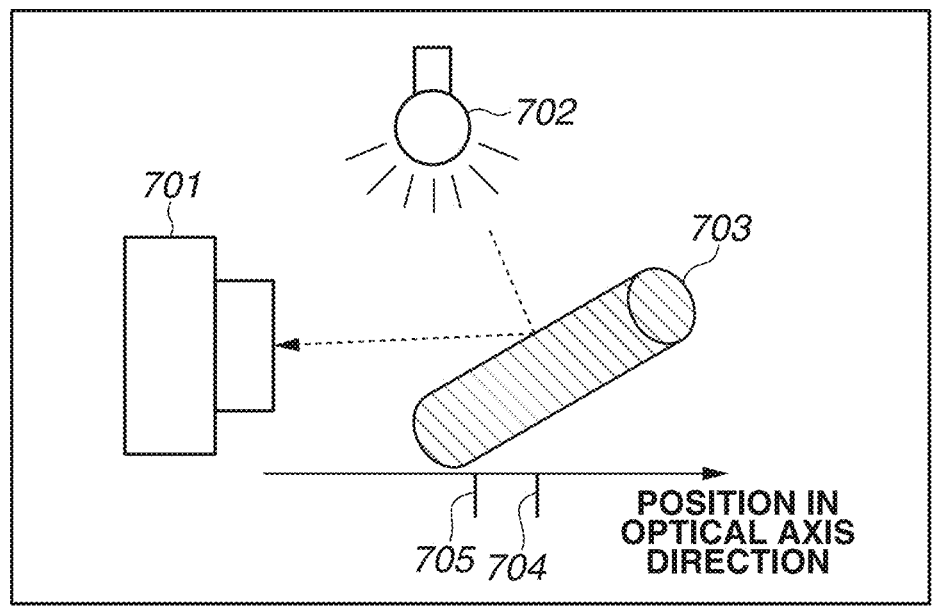
FIGS. 7A, 7B, 7C, and 7D are diagrams illustrating an example of image pickup for focus stacking.
Figure 7B:
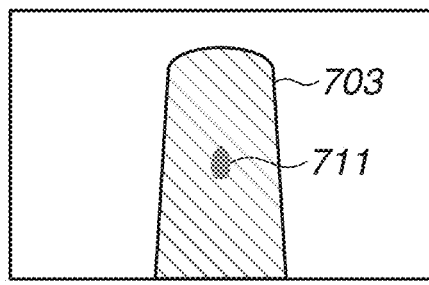
Figure 7C:
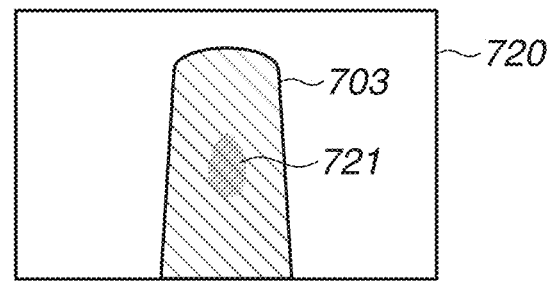

FIGS. 7A to 7D are diagrams illustrating an example of image pickup for focus stacking in the present exemplary embodiment. First, a scene where light from a light source is reflected will be described with reference to FIGS. 7A to 7D. FIG. 7A is a scene illustrating an environment in image pickup. In FIG. 7A, a digital camera 701 and a light source 702 are illustrated, and light is reflected by an object 703. In a case where image pickup for focus stacking is performed, the digital camera 701 performs image pickup at a plurality of in-focus positions between the closest end to the infinite end. An image captured at an in-focus position 704 is an image 710, and a region 711 is a region corresponding to the reflected light from the light source 702. In a case where the image is captured while being focused at the in-focus position 704, the light incident on the digital camera 701 after emitted from the light source 702 and reflected by the object 703 is least scattered, and the region corresponding to the reflected light is least blurred in the captured image, as illustrated in FIG. 7B. An in-focus position 705 is a position closer to the digital camera 701 than the in-focus position 704. In the case of focusing at the in-focus position 704, the region 711 can be captured without blurring. Meanwhile, FIG. 7C illustrates an image captured while being focused at the in-focus position 705, a region 721 is a region corresponding to the reflected light from the light source 702, and the blur is spread in the region 721 in comparison with the region 711.

Figure 7D:
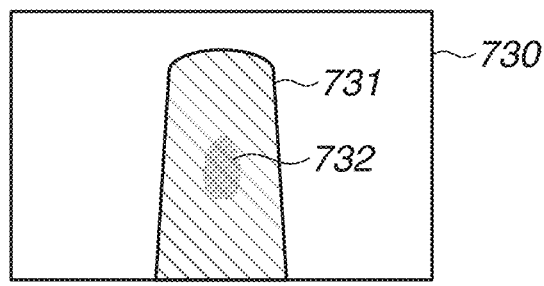
Figure 9:
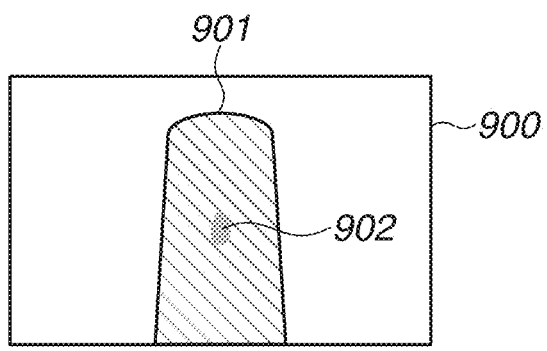
FIG. 9 is a diagram illustrating a result of composition using the corrected composite map in the exemplary embodiment of the disclosure.

In a case where the two images illustrated in FIG. 7B and FIG. 7C are combined by a conventional focus stacking method, an image illustrated in FIG. 7D is obtained. The contrast value in the region 721 is higher than that in the region at the same position in FIG. 7B, and therefore, a region 732 corresponding to the region 721 is present in the composite image illustrated in FIG. 7D. After the composite map correction in step S503, an excessive blur in the region 732 is removed. FIG. 9 is a diagram illustrating the result of the composition after the correction in the present exemplary embodiment. If the composite map is corrected in step S503, a composite image as represented by an image 900 is obtained.

Next, the processing procedure of the flowchart illustrated in FIG. 6 will be described.

Figure 8A:
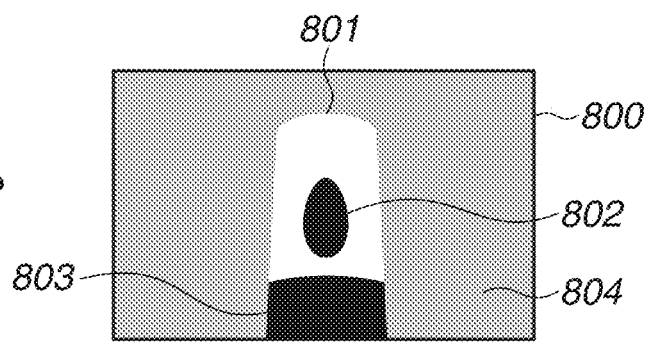
FIGS. 8A, 8B, 8C, and 8D are diagrams illustrating composite map correction in the exemplary embodiment of the disclosure.
Figure 8B:
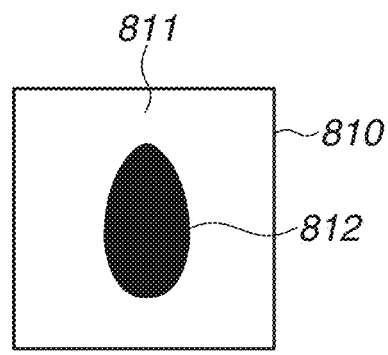

In step S601, the image processing unit 107 detects a closed region surrounded by values indicated by the composite map and each different from an outer periphery by a first threshold or more, in the composite map generated in step S502. FIGS. 8A to 8D are diagrams illustrating the composite map correction (composition ratio correction) in step S503 in the present exemplary embodiment. FIG. 8A is a composite map 800 in a case where the two images illustrated in FIG. 7B and FIG. 7C are combined. For example, a region 801 is a region where the image in FIG. 7B is combined at the ratio of 100%, each of a region 802 and a region 803 is a region where the image in FIG. 7C is combined at the ratio of 100%, and a region 804 is a region where the two images illustrated in FIG. 7B and FIG. 7C are mixed and combined. The region 802 corresponds to the region 721. In a case where the first threshold is 100%, a closed region surrounded by values each different from an outer periphery by 100% or more in the composite map 800 illustrated in FIG. 8A is detected, the detected closed region is the region 802, and a portion including the region 802 and the neighborhood thereof is extracted as an image 810 in FIG. 8B. In the detection of the closed region in step S601, correction to be described below may be performed in a case where, for example, the size of the closed region, i.e., the area thereof, is less than a second threshold, in order to avoid incorrect detection and insufficient detection.

Figure 10:
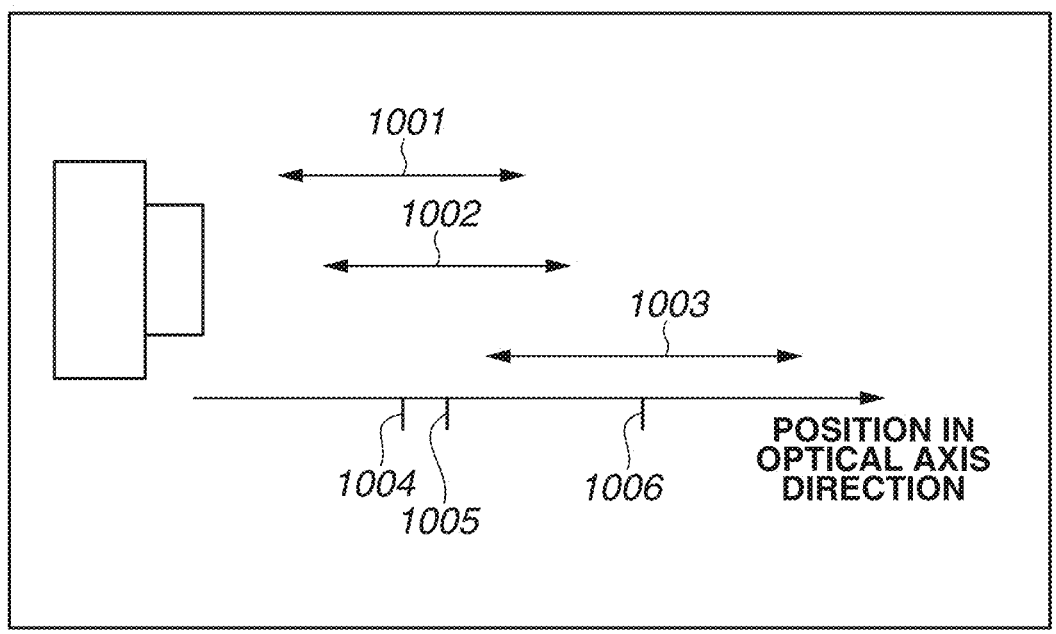
FIG. 10 is a diagram illustrating a relationship between in-focus position and depth of field in the exemplary embodiment of the disclosure.

A method of determining each of the above-described first and second thresholds will be described with reference to FIG. 10. FIG. 10 is a diagram illustrating the relationship between the in-focus position and the depth of field in the present exemplary embodiment. Depths of field 1001, 1002, and 1003 indicate depths of field in image pickup at in-focus positions 1004, 1005, and 1006, respectively. In a case where the image captured at the in-focus position 1004 and the image captured at the in-focus position 1005 are compared, these images are similar in terms of the way the blur spreads, because a region where the respective depths of field overlap is large. Meanwhile, in a case where the image captured at the in-focus position 1004 and the image captured at the in-focus position 1006 are compared, these images have difference in the way the blur spreads because a region where the respective depths of field overlap is small. In other words, it is possible to infer such a characteristic that, in an object having luster or reflected light, the spread amount of the blur increases with increase in the difference between the depths of field, and therefore an area of the closed region in the composite map increases. In addition, it can be said that the difference between the contrast values increases with increase in the difference between the depths of field, and therefore the difference between the composition ratio within the closed region and that outside the closed region becomes noticeable.

Figure 11A:
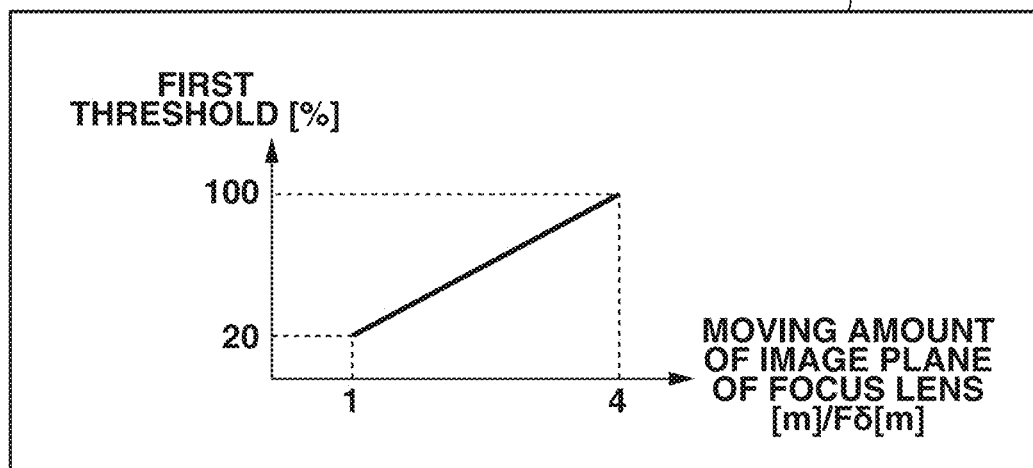
FIG. 11A is a graph illustrating how to determine a first threshold in the exemplary embodiment of the disclosure.
Figure 11B:
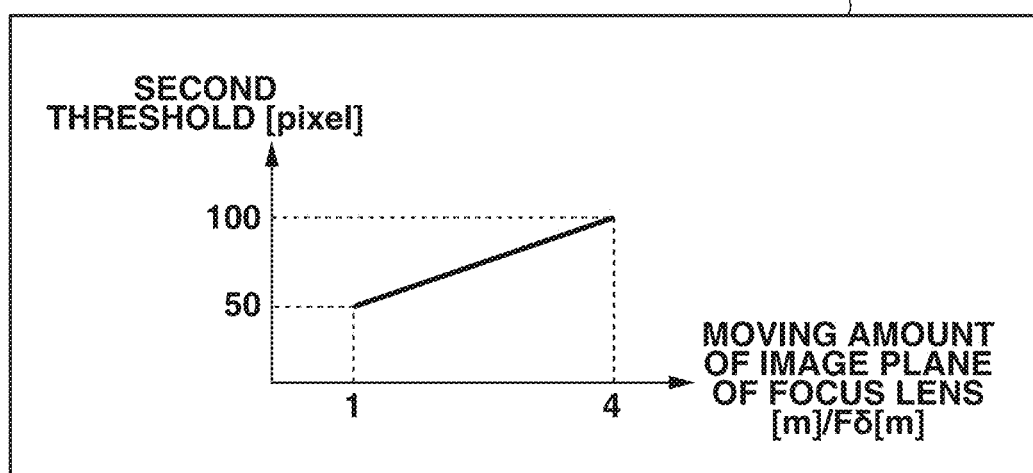
FIG. 11B is a graph illustrating how to determine a second threshold in the exemplary embodiment of the disclosure.

The above-described first and second thresholds are determined utilizing the above-described characteristic. FIGS. 11A and 11B are graphs illustrating how the first threshold and the second threshold are determined in the present exemplary embodiment. A graph 1100 in FIG. 11A represents the method of determining the first threshold, and a graph 1110 in FIG. 11B represents the method of determining the second threshold. F in the horizontal axis of the graph in each of FIGS. 11A and 11B represents an aperture value, and δ represents a permissible circle of confusion. In the graph 1100, the first threshold is proportional to a value calculated by dividing a moving amount of an image plane of the focus lens by the aperture value and the permissible circle of confusion. In the example illustrated in FIG. 11A, in a case where the minimum value and the maximum value of the values each obtained by dividing the moving amount of the image plane of the focus lens by the aperture value and the permissible circle of confusion are 1 and 4, respectively, the minimum value and the maximum value of the first threshold, i.e., a threshold for the determination in the closed region detection based on the difference between the composition ratios, are 20% and 100%, respectively, and the first threshold is made linearly proportional. For example, in a case where the value calculated by dividing the moving amount of the image plane of the focus lens by the aperture value and the permissible circle of confusion is 1, a range in which the depths of field overlap is large, and thus the difference between the composition ratio within the closed region and that outside the closed region is small. Therefore, the closed region can be detected by reducing the first threshold to 20%. In contrast, in a case where the value calculated by dividing the moving amount of the image plane of the focus lens by the aperture value and the permissible circle of confusion is 4, a range in which the depths of field overlap is small, and thus the difference between the composition ratio within the closed region and that outside the closed region is large. Therefore, the closed region can be detected even if the first threshold is 100%.

In the graph 1110 illustrated in FIG. 11B, as with the graph 1100, the second threshold is proportional to the value calculated by dividing the moving amount of the image plane of the focus lens by the aperture value and the permissible circle of confusion. In the example illustrated in FIG. 11B, in a case where the minimum value and the maximum value of the values each obtained by dividing the moving amount of the image plane of the focus lens by the aperture value and the permissible circle of confusion are 1 and 4, respectively, the minimum value and the maximum value of the second threshold, i.e., a threshold for the determination in the closed region detection based on the area, are 50 pixels and 100 pixels, respectively, and the second threshold is made linearly proportional. For example, in a case where the value calculated by dividing the moving amount of the image plane of the focus lens by the aperture value and the permissible circle of confusion is 1, a range in which the depths of field overlap is large, and thus the area of a region to be the closed region is small. Therefore, the detection accuracy is high even in a case where the second threshold is small. Meanwhile, in a case where the value calculated by dividing the moving amount of the image plane of the focus lens by the aperture value and the permissible circle of confusion is 4, a range in which the depths of field overlap is small, and thus the area of a region to be the closed region is large. Therefore, the closed region can be detected by the second threshold set at a large value.

Using the above-described determination method can reduce incorrect detection and insufficient detection of the closed region. In determining the graph of the threshold, a fixed value may be used for the permissible circle of confusion, or a value varying by a pixel pitch may be used.

Further, the graph illustrated in each of FIGS. 11A and 11B is the example of linear proportional, but a non-linear graph or a graph determined from an experimental result can be used.

Figure 8C:
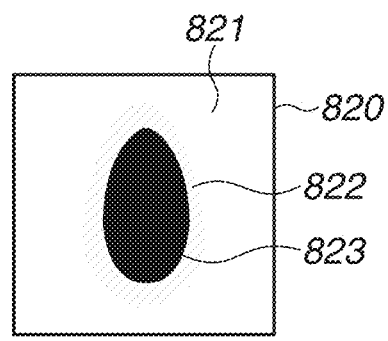
Figure 8D:
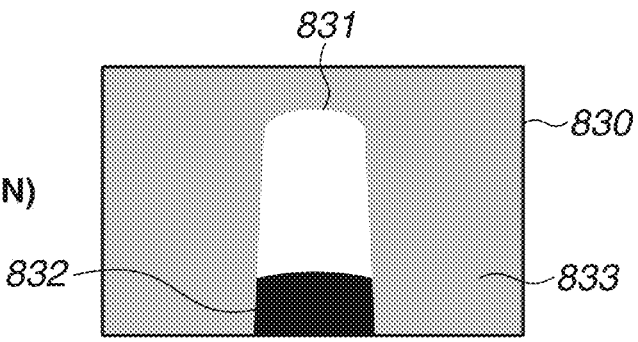

In step S602, a composite map correction value is determined from values outside the boundary of the closed region detected in step S601. In FIG. 8C, a composite map 820 indicates a region 822 outside the boundary of a closed region 812 in the image 810. For example, in a case an average composition ratio of the region 822 is calculated as the composite map correction value, all the composition ratios of the region 822 are 0%, and thus the composite map correction value is determined as 0%. The method of calculating the composition ratio is not limited to the average value, and, for example, the median value or the approximate value may be used. The area of the region 822 may be determined by at least one of the aperture value of the image, the in-focus position, and the number of pixels of the image.

In step S603, the image processing unit 107 corrects the closed region detected in step S601, using the composite map correction value determined in step S602. A composite map 830 in FIG. 8D indicates the result of correcting a region 823 using the composite map correction value of 0% determined in step S602. In a case where a depth map can be acquired in image pickup, the correction may be performed in a case where the difference between the closed region in the depth map and the region outside the boundary of the closed region is less than or equal to a third predetermined threshold, in order to avoid incorrect correction.

This ends the correction processing for the composite map in step S503.

In step S504, a pixel O(x,y) of the composite image obtained by combining the images which has been picked up after the alignment and has difference in in-focus position is generated based on the composite map corrected in step S503. Where a pixel of each of the images having difference in in-focus position is Im(x,y), an image is generated by the following expression (7) using the corrected composite map. In the expression (7), A'k(x,y) represents the composition ratio of the composite map after the correction.

$$O(x,y) = \sum_{k=1}^{M} A'_k(x,y) \times I_k(x,y) \qquad (7)$$

This processing ends the image composition processing in step S203.

FIG. 9 illustrates the composition result obtained by performing the image composition processing of the present exemplary embodiment. The image 900 is the result of the composition using the composite map which has been corrected, and the region 711 corresponding to the reflected light from the light source 702 focused at the in-focus position 704 appears as reflected light 902 resulting from the composition.

According to the present exemplary embodiment, the calculated composite map is corrected, and the composition is performed based on the corrected composite map, and therefore the composite image in which the blur of luster and reflection is reduced can be generated.

Other Exemplary Embodiments

The exemplary embodiment is described above based on the implementation using the digital camera, but is not limited to the digital camera. For example, a portable device having a built-in image sensor or a network camera capable of capturing an image may be used.

The disclosure can also be implemented by supplying a program that implements one or more functions of each of the above-described exemplary embodiment to a system or apparatus via a network or storage medium, and causing one or more processors in a computer of the system or apparatus to read out the program and run the read-out program. The disclosure can also be implemented by a circuit (e.g., an ASIC) for implementing the one or more functions.

According to the configuration of each of the exemplary embodiments, the blur of luster and reflected light in the image obtained by combining the plurality of images having difference in in-focus position can be reduced.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-228214, filed Dec. 18, 2019, which is hereby incorporated by reference herein in its entirety.

What is claimed is:
1. An apparatus, comprising:
at least one memory configured to store instructions; and
at least one processor in communication with the at least one memory and configured to execute the instructions to:
generate a composite map from a plurality of images having different in in-focus position in an optical axis direction,
correct the composite map, and
combine the plurality of images using the corrected composite map to generate a composite image,
wherein a depth of field of the composite image is deeper than the depth of field of each of the plurality of images, and wherein the at least one processor further executes instructions to detect a first region surrounded by values each representing a composition ratio in the composite map and each being different from an outer periphery by a first threshold or more, determine a correction value from a second region in the outer periphery of the first region, and correct the first region using the correction value.

2. The apparatus according to claim 1, wherein the at least one processor further executes instructions to generate the composite map from contrast values of the plurality of images.

3. The apparatus according to claim 2, wherein the at least one processor further executes instructions to compare contrast values of regions in correspondence with each other between the plurality of images, and assign a higher composition ratio to a region having a contrast value higher than that of the other regions.

4. The apparatus according to claim 1, wherein the at least one processor further executes instructions to perform the correction of the composite map in a case where an area of the first region is smaller than a second threshold.

5. The apparatus according to claim 4, wherein an area of the second region is determined by at least one of aperture values of an image, an in-focus position, and a number of pixels of an image.

6. The apparatus according to claim 1, wherein the correction value is an average value or a median value of the composition ratios of the second region.

7. The apparatus according to claim 1, wherein the first threshold is determined by a value calculated by dividing a moving amount of an image plane of a focus lens by an aperture value and a permissible circle of confusion.

8. The apparatus according to claim 4, wherein the second threshold is determined by a value calculated by dividing a moving amount of an image plane of a focus lens by an aperture value and a permissible circle of confusion.

9. The apparatus according to claim 1, wherein the at least one processor further executes instructions to perform the correction of the composite map in a case where a difference in the composition ratio between the first region and the second region is less than or equal to a predetermined third threshold.

10. The apparatus according to claim 1, further comprising:
a sensor configured to pick up the plurality of images having different in in-focus positions the optical axis direction.

11. A method, comprising:
generating a composite map from a plurality of images having different in in-focus position in an optical axis direction;
correcting the composite map; and
combining the plurality of images using the corrected composite map to generate a composite image,
wherein a depth of field of the composite image is deeper than the depth of field of each of the plurality of images, and
wherein, in the correction of the composite map, a first region surrounded by values each representing a composition ratio in the composite map and each being different from an outer periphery by a first threshold or more is detected, a correction value is determined from a second region in the outer periphery of the first region, and the first region is corrected using the correction value.

12. The method according to claim 11, further comprising generating the composite map from contrast values of the plurality of images.

13. The method according to claim 11, further comprising performing the correction of the composite map in a case where an area of the first region is smaller than a second threshold.

14. The method according to claim 11, wherein an area of the second region is determined by at least one of aperture values of an image, an in-focus position, and a number of pixels of an image.

15. The method according to claim 11, wherein the correction value is an average value or a median value of the composition ratios of the second region.

16. A non-transitory computer-readable storage medium which stores a program for causing a computer of an image pickup apparatus to execute a method comprising:
generating a composite map from a plurality of images having different in in-focus position in an optical axis direction;
correcting the composite map; and
combining the plurality of images using the corrected composite map to generate a composite image,
wherein a depth of field of the composite image is deeper than the depth of field of each of the plurality of images, and
wherein, in the correction of the composite map, a first region surrounded by values each representing a composition ratio in the composite map and each being different from an outer periphery by a first threshold or more is detected, a correction value is determined from a second region in the outer periphery of the first region, and the first region is corrected using the correction value.

17. The non-transitory computer-readable storage medium according to claim 16, further comprising generating the composite map from contrast values of the plurality of images.

18. The non-transitory computer-readable storage medium according to claim 16, further comprising performing the correction of the composite map in a case where an area of the first region is smaller than a second threshold.

19. The non-transitory computer-readable storage medium according to claim 16, wherein an area of the second region is determined by at least one of aperture values of an image, an in-focus position, and a number of pixels of an image.

20. The non-transitory computer-readable storage medium according to claim 16, wherein the correction value is an average value or a median value of the composition ratios of the second region.

21. An apparatus, comprising:
at least one memory configured to store instructions; and
at least one processor in communication with the at least one memory and configured to execute the instructions to:
generate a composite map from a plurality of images having a different in in-focus position in an optical axis direction,
perform a correction on the composite map, and
combine the plurality of images using the composite map to generate a composite image,
wherein a depth of field of the composite image is deeper than the depth of field of each of the plurality of images, and
wherein blur of luster and/or reflected light is reduced in the composite image using the composite map after the correction, compared with the composite image using the composite map without performing the correction.

22. The apparatus according to claim 21, wherein a composite ratio of representative regions of the composite map is based on contrast values of corresponding region of the plurality of images, except for regions of the blur of luster and/or the reflected light.

\* \* \* \* \*